United States Patent [19]
Nguyen et al.

[11] Patent Number: 5,613,125
[45] Date of Patent: Mar. 18, 1997

[54] METHOD AND SYSTEM FOR SELECTIVELY DEFINING HARDWARE PARAMETERS IN AN EXECUTABLE OPERATING SYSTEM PROGRAM

[75] Inventors: Lan V. Nguyen; C. Bala Kumar, both of Austin, Tex.

[73] Assignee: Motorola, Inc., Schaumburg, Ill.

[21] Appl. No.: 691,227

[22] Filed: Aug. 1, 1996

Related U.S. Application Data

[63] Continuation of Ser. No. 262,111, Jun. 17, 1994.

[51] Int. Cl.$^6$ ..................................................... G06F 9/44
[52] U.S. Cl. ............................................................. 395/651
[58] Field of Search ............................................... 395/700

[56] References Cited

U.S. PATENT DOCUMENTS

| | | | |
|---|---|---|---|
| 4,589,063 | 5/1986 | Shah et al. | 364/200 |
| 4,649,479 | 3/1987 | Advani et al. | 364/200 |
| 5,025,366 | 7/1991 | Baror | 364/200 |
| 5,245,702 | 9/1993 | McIntyre et al. | 395/164 |
| 5,247,682 | 9/1993 | Kondou et al. | 395/700 |
| 5,261,104 | 11/1993 | Bertram et al. | 395/700 |
| 5,291,585 | 3/1994 | Sato et al. | 395/500 |
| 5,349,661 | 9/1994 | Brewer et al. | 395/700 |
| 5,355,498 | 10/1994 | Provino et al. | 395/700 |
| 5,390,301 | 2/1995 | Scherf | 395/325 |

OTHER PUBLICATIONS

Brett Glass, "The IBM PC BIOS", Byte, Apr. 1989, pp. 303–310.
PVI-486AP4 User's Manual, ASUSTeK, 1994, pp. 3–1 to 3–35.

*Primary Examiner*—Kevin A. Kriess
*Assistant Examiner*—Dennis M. Butler
*Attorney, Agent, or Firm*—S. Kevin Pickens

[57] ABSTRACT

A method and system for selectively defining hardware parameters in an executable operating system program provides the advantage of enabling or disabling hardware features during testing without having to modify and recompile the operating system source program. In an implementation of a preferred embodiment, a hardware control variable is stored in a configuration file in memory. The configuration file is accessible to the user to define or modify the hardware control variable as desired. The hardware control variable contains a number of hardware control bits, each corresponding to a hardware parameter in the executable operating system program. During execution, the executable operating system program defines the hardware parameters based on the values of the corresponding hardware control bits. The executable operating system program enables or disables the hardware features based on how the hardware parameters are defined.

6 Claims, 3 Drawing Sheets

FIG. 2 - PRIOR ART -

```
DATA_CACHE=NO

FORCE_WRITE_THROUGH=NO
```

```
READ HW_CONTROL

IF HW_CONTROL(DATA_CACHE ENABLE BIT) = 1
   THEN DATA_CACHE = YES
      IF HW_CONTROL(FORCE_WRITE_THROUGH ENABLE BIT) = 1
         THEN FORCE_WRITE_THRU = YES
         ELSE FORCE_WRITE_THRU = NO
   ELSE DATA_CACHE = NO
```

METHOD AND SYSTEM FOR SELECTIVELY DEFINING HARDWARE PARAMETERS IN AN EXECUTABLE OPERATING SYSTEM PROGRAM

This application is a continuation of prior application Ser. No. 08/262,111 filed Jun. 17, 1994 now abandoned.

TECHNICAL FIELD

This invention relates generally to operating systems and, more particularly, to hardware parameters in operating systems.

BACKGROUND OF THE INVENTION

A conventional computer system includes a computer having a memory, a processor and other hardware. Typically, an executable operating system program is stored in the memory which, when executed by the processor, controls operation of the computer system. During execution, the executable operating system program utilizes various features of the processor and other hardware. When testing new or modified hardware or a new or modified operating system, it is essential that many of these hardware features can be enabled or disabled by the testing computer scientist or engineer (user). This selection allows for different testing scenarios to be attempted and for problems to be isolated to specific areas of hardware or software.

Conventionally, the selection of hardware features has required the cumbersome process of modifying and recompiling the operating system source program. The operating system source program is read into memory from a peripheral or remote storage device, such as a hard disk. The user searches for and locates hardware parameters in the operating system source program. These hardware parameters determine whether the executable operating system program enables or disables corresponding hardware features during execution. The user selectively defines the hardware parameters as desired. The user then recompiles the source program to produce a new and different executable operating system program which replaces the previous executable operating system program and which, when executed, enables and disables the hardware features selectively defined by the user.

The cumbersome process described above has to be undertaken each time the user desires to enable or disable different hardware features. In testing the hardware or operating system, it is not uncommon for the user to begin with most or all hardware features disabled, and then to enable the hardware features one or two at a time until a large number of features are enabled. As a result, a great deal of time, effort and resources are expended during the testing process. Further, modifying the operating system source program introduces the risk of creating errors in the source program. Thus, a more accurate and efficient means is needed for selectively enabling and disabling hardware features in a computer system.

BRIEF DESCRIPTION OF THE DRAWINGS

FIG. 2 is a pseudocode representation of part of an operating system source program having fixed hardware parameters as in the prior art.

DESCRIPTION OF THE PREFERRED EMBODIMENT

In a preferred embodiment of the invention, a method and system is provided for selectively defining hardware parameters in an executable operating system program. This provides to computer scientists and engineers (users) testing the hardware or operating system the advantage of enabling or disabling hardware features as desired without having to modify and recompile the operating system source program. As a result, testing can be performed quickly and accurately.

In an implementation of the preferred embodiment, a hardware control variable is stored in a configuration file in memory. The hardware control variable contains a number of hardware control bits, each corresponding to a definition of a hardware parameter in the executable operating system program. During execution, the executable operating system program defines the hardware parameters based on the values of the corresponding hardware control bits. The executable operating system program enables or disables the hardware features based on how the hardware parameters are defined.

The configuration file is accessible to the user to define or modify the hardware control variable as desired. For example, the user may disable a hardware feature before testing by clearing the corresponding hardware control bit in the hardware control variable. As a result, the executable operating system program defines the appropriate hardware parameter to disable the hardware feature. After testing with the hardware feature disabled, the hardware feature can be enabled by setting the corresponding hardware control bit in the hardware control variable. The hardware or operating system can then be retested with the hardware feature enabled by simply executing the executable operating system program again. Recompiling the operating system source program is not necessary.

Figure 1:
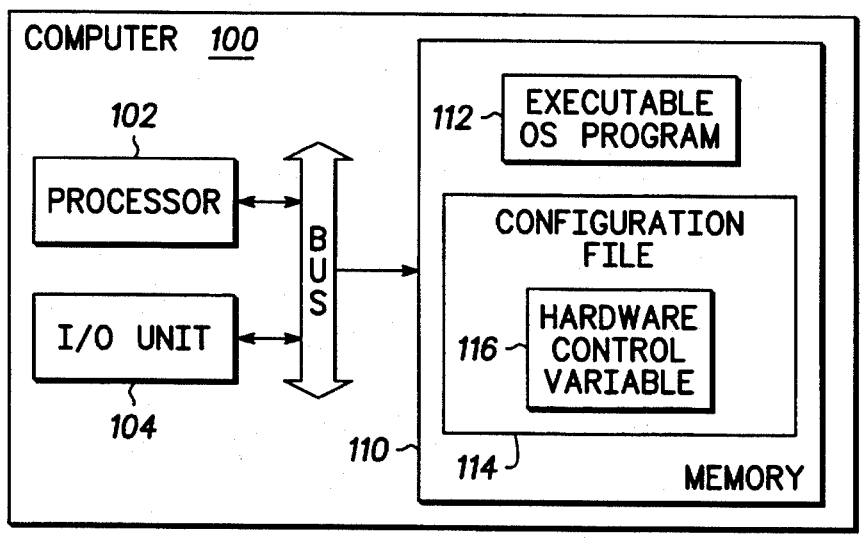
FIG. 1 is block diagram of a computer system configured in accordance with a preferred embodiment of the invention.

FIG. 1 shows a block diagram of a computer system configured in accordance with the preferred embodiment of the invention. In FIG. 1, a computer 100 includes a processor 102 and an I/O unit 104. The processor 102 and I/O unit 104 are connected via bus to a memory 110. The memory 110 stores an executable operating system program 112 and a configuration file 114 along with other programs and data (not shown). One of ordinary skill in the computer art will readily implement the invention in any of a number of variations of the computer system of FIG. 1. The computer 100 may be virtually any computer using virtually any type of processor 102, such as a Motorola, Inc. 68000 series microprocessor, and running any of a variety of operating systems, such as the UNIX operating system.

The configuration file 114 stores hardware control variable 116. Alternatively, the hardware control variable 116 may be stored in a fixed memory location in the memory 110. Unlike the fixed hardware parameters of prior art operating systems, the hardware parameters in the executable operating system 112 of the preferred embodiment are variable. That is, the executable operating system program 112 defines these variable hardware parameters during execution based on values in the hardware control variable 116 in the configuration file 114.

The difference between variable and fixed hardware parameters is illustrated with reference to FIGS. 2 and 3. FIG. 2 is a pseudocode representation of part of an operating system source program (source program) having fixed hardware parameters, as in the prior art. In order to selectively enable or disable the hardware features, the user has to modify the source program code and then recompile the source program to produce a new and different executable operating system program (executable program).

For example, in order to enable a data cache the user is required to search for, locate and modify the code in the source program that defines the hardware parameter Data_Cache from "Data_Cache=NO" to "Data_Cache=YES". Then the user must recompile the source program to produce a new and different executable program. The user then must replace the previous executable program and execute the new executable operating system program to perform testing with the data cache feature enabled. If the user then desires to perform further testing with, for example, a "force write-through" feature enabled, the user must again search for, locate and modify the code in the source program that defines the hardware parameter Force_Write_Through to "Force_Write_Through=YES", and again recompile the source program to produce and execute yet another executable program. Such is the case for each additional hardware feature the user desires to enable or disable.

Figure 3:
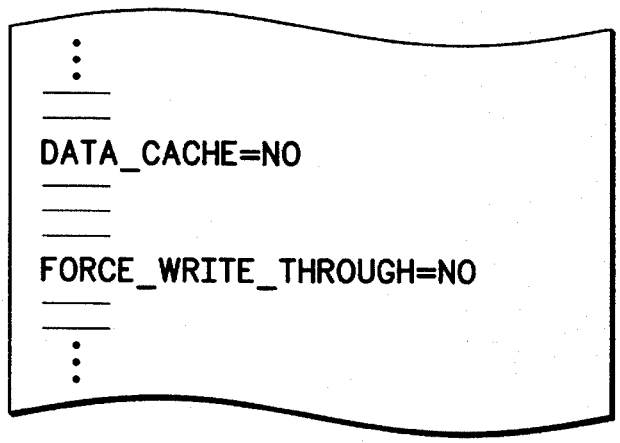
FIG. 3 is a pseudocode representation of part of an operating system source program having variable hardware parameters provided in accordance with the preferred embodiment.

FIG. 3 is a pseudocode representation of part of an operating system source program having variable hardware parameters in accordance with the preferred embodiment of the invention. Once the source program of FIG. 3 has been compiled a single time, the user can enable or disable the hardware features of the computer system any number of times as desired without having to recompile the source program. This is because the executable operating system program 112 reads the hardware control variable 116 from the configuration file 114 to define the variable hardware parameters during execution. The user can selectively define the hardware parameters by defining the values in the hardware control variable 116 before execution of the executable program 112.

For example, in the source program of FIG. 3, if a Data_Cache Enable bit in the hardware control variable 116 is set to 1 at the time of execution of the executable program 112, then the hardware parameter Data_Cache is defined by "Data_Cache=YES" and the data cache feature is enabled by the executable program 112 during execution. Otherwise, the hardware parameter is defined by "Data_Cache=NO" and the data cache feature is disabled by the executable program 112 during execution. The user can then retest with the force write through enavled by simply setting a Force_Write_Through enable bit in the hardware control variable 116 and re-executing the executable program 112. Control bits such as the Data_Cache Enable bit and the Force_Write_Through enable bit will be defined in more detail below.

Figure 4:
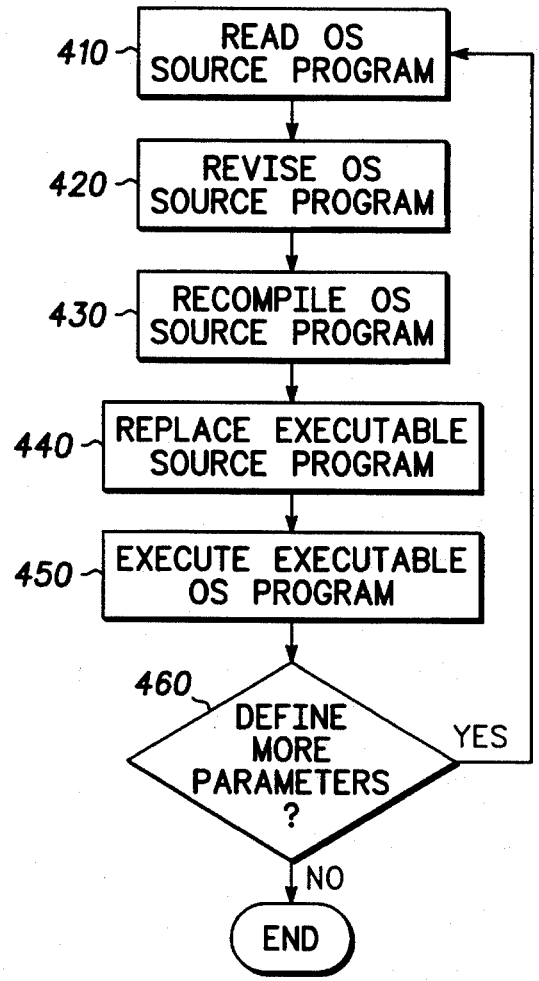
FIG. 4 is a flow diagram of a prior art method of defining fixed hardware parameters in a computer system.
Figure 5:
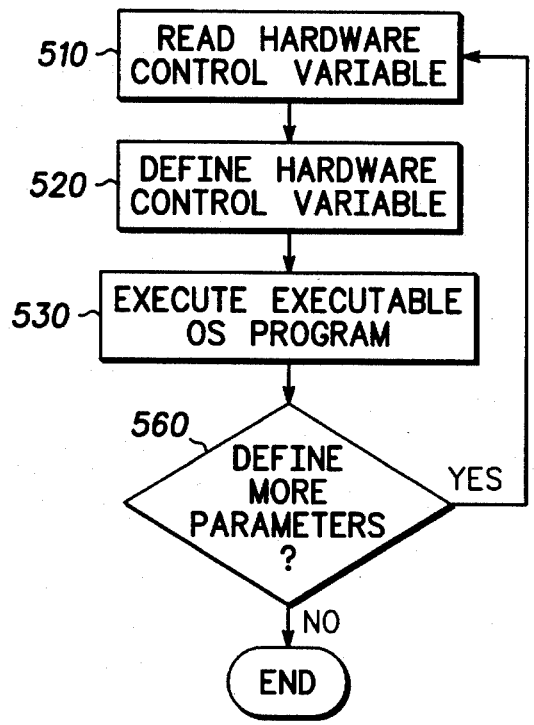
FIG. 5 is a flow diagram of the preferred embodiment method of defining the variable hardware parameters.

The advantages provided by the variable hardware parameters of the preferred embodiment over fixed hardware parameters can be illustrated with respect to FIG. 4 and FIG. 5. FIG. 4 is a flow diagram of the prior art method of defining fixed hardware parameters. In step 410 of FIG. 4, the user reads the operating system source program into the memory 110. In step 420, the user revises the operating system source program to define the hardware parameters as desired. For example, the user may revise the operating system source program of FIG. 3 from "Data_Cache=NO" to "Data_Cache=YES", as discussed above. In step 430, the user recompiles the source program to produce a new and different executable operating system program which replaces the previous executable program in step 440. In step 450, the user executes the new executable program, which enables and disables the hardware features corresponding to the revised hardware parameters. In step 460, as long as the user decides to revise more parameters, then steps 410–460 must be repeated for each revision.

FIG. 5 is a flow diagram of the method of defining the variable hardware parameters of the preferred embodiment. In step 510, the user reads the hardware control variable 116 from the configuration file 114 in the memory 110. In step 520, the user defines the hardware control variable 116 by setting or clearing hardware control bits in the executable operating system program 112. In step 530 the user executes the executable program 112, which reads the hardware control variable 116 and defines the hardware parameters based on the values in the hardware control variable. Alternatively, the executable program 112 may be linked to the configuration file 114 or to a fixed memory location in the memory 110 storing the hardware control variable 116. In step 540, as long as the user decides to define more parameters, the steps 510–530 are repeated for each revision.

Thus, as can be seen from comparing FIG. 4 and FIG. 5 above, the method of defining hardware parameters in the preferred embodiment renders unnecessary the steps 410, 420, 430 and 440 of the prior art method. It is not necessary to perform step 410 of reading the operating system source program, which may be stored externally to the computer 100, or could be unavailable altogether. Further, it is not necessary to perform step 420 of searching for and revising the hardware parameters in the operating system source program. As a result, time is saved and errors are prevented. It is also unnecessary to perform steps 430 and 440 of recompiling the executable operating system 112 and replacing the previous executable operating system program. Thus, a great deal of time, effort and resources are saved by the preferred embodiment of the invention.

Figure 6:
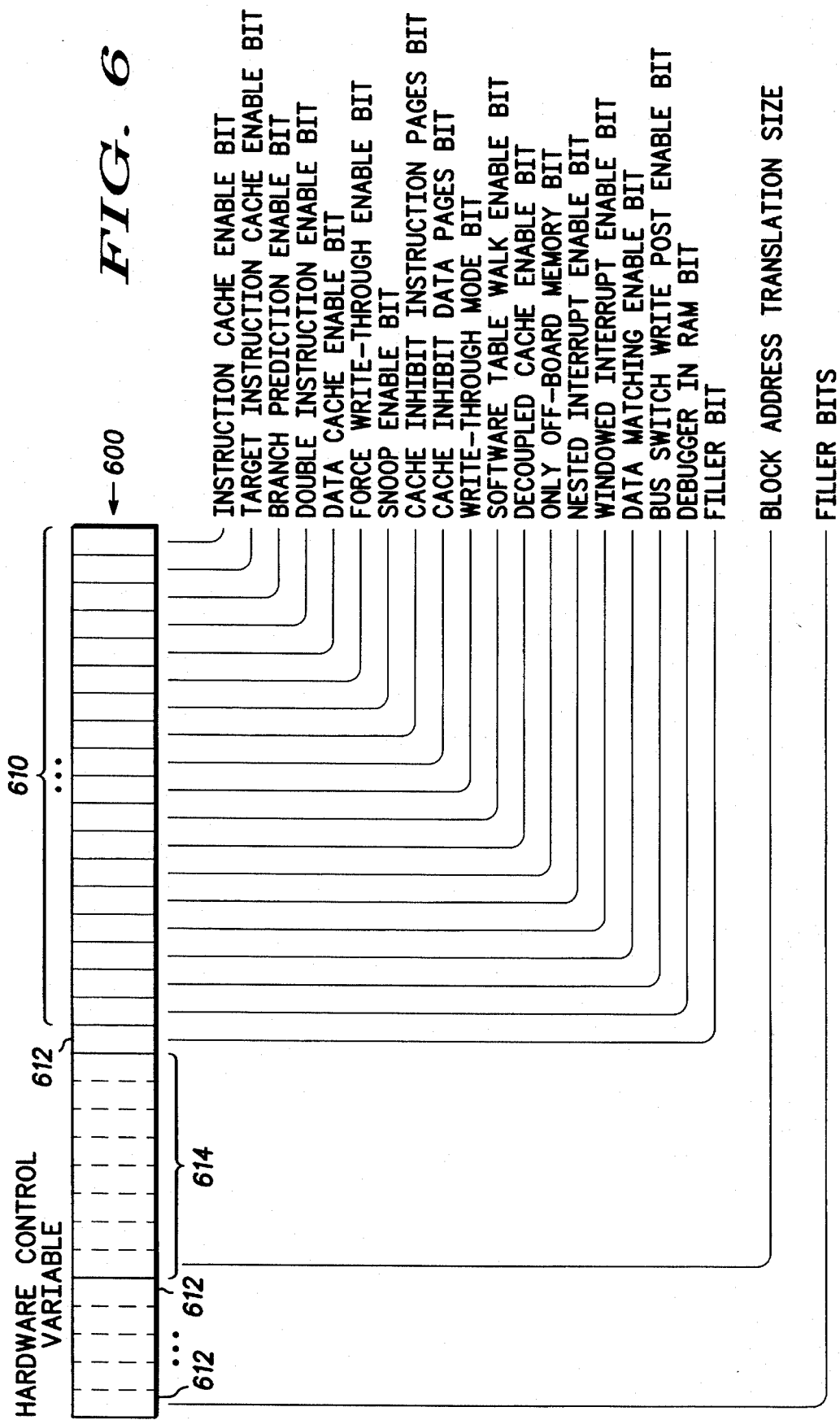
FIG. 6 is an illustration of a hardware control variable provided in accordance with the preferred embodiment of the invention.

FIG. 6 is an illustration of one possible implementation of the hardware control variable 116, provided in accordance with the preferred embodiment of the invention. In FIG. 6, a 32-bit hardware control variable 600 provides such an implementation of hardware control variable 116 which is particularly suited for the UNIX operating system executing on a MC68000 series microprocessor, produced by Motorola, Inc. The hardware control variable 600 contains hardware control bits 610. Each of the hardware control bits 610 is either set to 1 or cleared to 0 to indicate the definition of the corresponding hardware parameter in the executable operating system program 112.

As has been explained with reference to FIG. 3, the executable operating system program 112 defines the hardware parameters based on the values in the hardware control variable 116. In the case of hardware control variable 600, the executable operating system program 112 defines the hardware parameters based on the values (1 or 0) of the hardware control bits 610. The 32-bit hardware control variable 600 also includes filler bits 612 and Block Address Translation Cache Size Byte 614, which will be explained below.

In the implementation of the preferred embodiment shown in FIG. 6, the following hardware control bits 610 each indicate that the corresponding hardware parameters are to be defined so as to enable or disable corresponding hardware features:

Instruction Cache Enable Bit

When this bit is set, an instruction cache is enabled.

Target Instruction Cache Enable Bit

When this bit is set, a target instruction cache in the processor 102 is enabled.

Branch Prediction Enable Bit

When this bit is set, a branch prediction function is enabled.

Double Instruction Issue Enable Bit

When this bit is set, the executable operating system program 112 enables double instruction issue in the processor 102.

Data Cache Enable Bit

When this bit is set, the executable operating system program 112 enables a data cache in the processor 102.

Force Write-Through Enable Bit

When this bit is set, the executable operating system program 112 enables a force write-through function in the data caches.

Snoop Enable Bit

When this bit is set, the executable operating system program 112 enables a snooping function in the data caches.

Cache Inhibit Instruction Pages Bit

When this bit is set, the executable operating system 112 makes all instruction pages cache-inhibited.

Cache Inhibit Data Pages Bit

When this bit is set, the executable operating system 112 cache inhibits data space pages.

Write-Through Mode Bit

When this bit is set, the operating system places all data pages in a write-through mode.

Software Table Walk Enable Bit

When this bit is set, the executable operating system program 112 will disable a hardware table walk function and instead employ a software table walk function to obtain page translation entries.

Decoupled Cache Enable Bit

When this bit is set, the executable operating system program 112 will enable a decoupled cache in the processor 102.

Only Off-Board Memory Bit

When this bit is set, then the executable operating system program 112 will map only portions of the memory 110 which are not provided on a main board.

Nested Interrupt Enable Bit

When this bit is set, the executable operating system program 112 will allow interrupts to be nested.

Window Interrupt Enable Bit

When this bit is set, the executable operating system program 112 will set registers in the processor 102 to delay interrupts for a determined window of time.

Data Matching Disable Bit

When this bit is set, the executable operating system program 112 will disable the processor 102 from reading values loaded in a previous cycle.

Bus Switch Write Post Enable Bit

When this bit is set, the executable operating system program 112 will enable a write posting function in the bus switch which retains the address of the last write performed.

Debugger in RAM Bit

When this bit is set, the operating system obtains a debugger in RAM instead of ROM, which is the conventional location.

The Hardware Control Variable 600 also contains Filler Bits 612 and a Block Address Translation Cache Size Byte 614:

Filler Bits

The filler bits 612 are provided for future expansion of hardware parameters.

Block Address Translation Cache Size Byte

The Block Address Translation Cache Size Byte 614 holds a value which indicates the size of a block of the memory 110 to which addresses are mapped in each entry in a Block Address Translation Cache. The executable operating system program 112 uses the block address translation cache size to determine the addresses to which the entries are mapped.

While specific embodiments of the invention have been shown and described, further modifications and improvements will occur to those skilled in the art. For example, the inventive concept can be implemented by an operating system to selectively define the hardware parameters where different hardware versions require the disabling of different features. It is understood that this invention is not limited to the particular forms shown and it is intended for the appended claims to cover all modifications of the invention which fall within the true spirit and scope of the invention.

What is claimed is:

1. A method of selectively defining a hardware parameter in an executable operating system program, the method performed by a computer system having a processor and a memory storing the executable operating system program, and the method comprising the steps of:

storing in the memory a configuration file including a hardware control variable comprising the following hardware control bits:

an instruction cache enable bit indicating whether an instruction cache is enabled, a target instruction cache enable bit indicating whether a target instruction cache in the processor is enabled, a branch prediction enable bit indicating whether a branch prediction function is enabled, a double instruction issue enable bit indicating whether a double instruction issue in the processor is enabled, a data cache enable bit indicating whether a data cache in the processor is enabled, a force write-through bit indicating whether a force write-through function in the data cache in the processor is enabled, a snoop enable bit indicating whether a snooping function in the data cache in the processor is enabled, a cache inhibit instruction pages bit indicating whether all instruction pages are cache inhibited, a cache inhibit data pages bit indicating whether data space pages are cache inhibited, a write-through mode bit indicating whether the executable operating system places all data pages in a write-through mode, a software table walk enable bit indicating whether a software table walk function is enabled, a decoupled cache enable bit indicating whether a decoupled cache in the processor is enable, an only off board memory bit indicating whether the executable operating system program will map only portions of the memory which are not provided on a main board, a nested interrupt enable bit indicating whether the executable operating system program will allow interrupts to be nested, a window interrupt enable bit indicating whether the executable operating system will delay interrupts for a determined window of time, and a data matching disable bit indicating whether the processor will be enabled to read values loaded in a previous cycle;

obtaining from a user a value corresponding to a definition of a hardware parameter represented by at least one of the hardware control bits;

storing in the memory the hardware control variable indicating the value corresponding to the definition of the hardware parameter; and executing the executable operating system program, the executable operating system program defining the hardware parameter during execution based on the value indicated by the hardware control variable.

2. The method of claim 1 wherein the step of obtaining the value from the user comprises obtaining multiple values, wherein the step of storing the hardware control variable comprises storing the hardware control variable indicating the multiple values, and wherein the step of executing the executable operating system program comprises the executable operating system program defining multiple hardware parameters based on the multiple values.

3. The method of claim 1 wherein the step of storing the hardware control variable comprises storing the hardware control variable in a configuration file in the memory accessible to a user, further comprising the step of the user changing the hardware parameter by reading the configuration file, defining the hardware control variable stored in the configuration file to produce a defined hardware control variable having a new value, and storing the configuration file having the defined hardware control variable in the memory, and wherein the step of executing the executable operating system program comprises the executable operating system program reading the defined hardware control variable from the configuration file and defining the hardware parameter based on the new value of the defined hardware control variable.

4. A computer system for selectively defining a hardware parameter in an executable operating system program, the computer system having a memory storing the executable operating system program, and the computer system comprising:

a configuration file stored in the memory including a hardware control variable comprising the following hardware control bits:

an instruction cache enable bit indicating whether an instruction cache is enabled, a target instruction cache enable bit indicating whether a target instruction cache in the processor is enabled, a branch prediction enable bit indicating whether a branch prediction function is enabled, a double instruction issue enable bit indicating whether a double instruction issue in the processor is enabled, a data cache enable bit indicating whether a data cache in the processor is enabled, a force write-through bit indicating whether a force write-through function in the data cache in the processor is enabled, a snoop enable bit indicating whether a snooping function in the data cache in the processor is enabled, a cache inhibit instruction pages bit indicating whether all instruction pages are cache inhibited, a cache inhibit data pages bit indicating whether data space pages are cache inhibited, a write-through mode bit indicating whether the executable operating system places all data pages in a write-through mode, a software table walk enable bit indicating whether a software table walk function is enabled, a decoupled cache enable bit indicating whether a decoupled cache in the processor is enable, an only off board memory bit indicating whether the executable operating system program will map only portions of the memory which are not provided on a main board, a nested interrupt enable bit indicating whether the executable operating system program will allow interrupts to be nested, a window interrupt enable bit indicating whether the executable operating system will delay interrupts for a determined window of time, and a data matching disable bit indicating whether the processor will be enabled to read values loaded in a previous cycle;

the processor obtaining from a user a value corresponding to a definition of a hardware parameter represented by at least one of the hardware control bits;

the memory storing the hardware control variable indicating the value corresponding to the definition of the hardware parameter; and the processor executing the executable operating system program, the executable operating system program defining the hardware parameter during execution based on the value indicated by the hardware control variable.

5. The computer system of claim 4 wherein the hardware control variable indicates multiple values corresponding to definition of multiple hardware parameters, and wherein the executable operating system program defines the multiple hardware parameters based on the multiple values during execution.

6. The computer system of claim 4 wherein the memory stores the hardware control variable in a configuration file accessible by a user to define the hardware parameter by defining a value in the hardware control variable.

* * * * *